(12) United States Patent
Oh et al.

(10) Patent No.: US 12,072,571 B2
(45) Date of Patent: *Aug. 27, 2024

(54) POLARIZING PLATE AND OPTICAL DISPLAY COMPRISING THE SAME

(71) Applicant: SAMSUNG SDI CO., LTD., Yongin-si (KR)

(72) Inventors: Young Oh, Suwon-si (KR); Jeong Ho Lee, Suwon-si (KR); Dong Ho Wee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,604

(22) Filed: Oct. 6, 2022

(65) Prior Publication Data

US 2023/0045600 A1    Feb. 9, 2023

Related U.S. Application Data

(63) Continuation of application No. 16/506,815, filed on Jul. 9, 2019, now Pat. No. 11,487,147.

(30) Foreign Application Priority Data

Jul. 10, 2018   (KR) .................. 10-2018-0080196

(51) Int. Cl.
    *G02F 1/1335*   (2006.01)
    *G02F 1/13357*  (2006.01)
    *G02F 1/1337*   (2006.01)

(52) U.S. Cl.
    CPC .. *G02F 1/133528* (2013.01); *G02F 1/133502* (2013.01); *G02F 1/133606* (2013.01);
    (Continued)

(58) Field of Classification Search
    CPC .............. G02B 5/305; G02F 1/133504; G02F 1/133528; G02F 1/133606;
    (Continued)

(56) References Cited

U.S. PATENT DOCUMENTS 11,487,147 B2 *  11/2022  Oh ................... G02F 1/133504
2016/0077248 A1   3/2016  Shim
(Continued)

FOREIGN PATENT DOCUMENTS

CN      103885106 A    6/2014
JP      2000-284726 A  10/2000
(Continued)

OTHER PUBLICATIONS

Korean Office action dated Aug. 30, 2021 issued in corresponding KR Application No. 10-2018-0080196, 4 pages.
(Continued)

*Primary Examiner* — Sophie Hon
(74) *Attorney, Agent, or Firm* — Lewis Roca Rothgerber Christie LLP

(57) ABSTRACT

A polarizing plate and an optical display including the same are provided. A polarizing plate includes: a polarizing film; a first base layer; and a pattern layer, the first base layer and the pattern layer being sequentially arranged on a light exit surface of the polarizing film, and the pattern layer includes a first layer and a second layer sequentially arranged on the first base layer, the first layer having a higher index of refraction than the second layer, and the first layer includes a patterned portion at at least a portion thereof facing the second layer, the patterned portion including at least two optical patterns and a flat section between optical patterns of the at least two optical patterns that are adjacent to each other.

16 Claims, 2 Drawing Sheets

(52) U.S. Cl.
 CPC .... *G02F 1/13362* (2013.01); *G02F 1/133711* (2013.01); *C09K 2323/031* (2020.08); *G02F 1/133607* (2021.01)

(58) Field of Classification Search
 CPC ........... G02F 1/133607; G02F 1/13362; G02F 1/133711; C09K 2323/031
 See application file for complete search history.

(56) References Cited

U.S. PATENT DOCUMENTS

| | | | |
|---|---|---|---|
| 2016/0187699 A1 | 6/2016 | Ju | |
| 2016/0252665 A1* | 9/2016 | Lee | G02B 1/14 359/489.07 |

FOREIGN PATENT DOCUMENTS

| | | | | |
|---|---|---|---|---|
| JP | 2006251659 | | 9/2006 | |
| JP | 2007-148185 | A | 6/2007 | |
| JP | 2017-105069 | A | 6/2017 | |
| JP | 7263162 | B2 * | 4/2023 | ............... G02B 1/04 |
| KR | 10-2013-0071414 | A | 6/2013 | |
| KR | 10-2014-0081653 | A | 7/2014 | |
| KR | 10-2017-0057087 | A | 5/2017 | |
| KR | 102393270 | B1 * | 5/2022 | ............... G02B 1/04 |
| TW | 2018-17591 | A | 5/2018 | |
| TW | 1777073 | B * | 9/2022 | ............... G02B 1/04 |

OTHER PUBLICATIONS

Chinese Office action dated Mar. 15, 2021 issued in corresponding CN Application No. 201910618567.8, 8 pages.
Korean Office action dated Jan. 27, 2021 issued in corresponding KR Application No. 10-2018-0080196, 4 pages.
Korean Office action dated Jun. 30, 2020 issued in corresponding KR Application No. 10-2018-0080196, 5 pages.
Taiwan Office action dated Mar. 31, 2020 issued in corresponding TW Application No. 108124255, 9 pages.

* cited by examiner

POLARIZING PLATE AND OPTICAL DISPLAY COMPRISING THE SAME

CROSS-REFERENCE TO RELATED APPLICATIONS

This application is a continuation of U.S. patent application Ser. No. 16/506,815, filed Jul. 9, 2019, which claims priority to and the benefit of Korean Patent Application No. 10-2018-0080196, filed on Jul. 10, 2018 in the Korean Intellectual Property Office, the entire disclosures of both of which are incorporated herein by reference.

BACKGROUND

1. Field

Aspects of embodiments of the present invention relate to a polarizing plate and an optical display including the same.

2. Description of the Related Art

A liquid crystal display is operated to emit light through a liquid crystal panel after receiving the light from a backlight unit. Since light from the backlight unit is vertically incident on a screen of the liquid crystal display, a side of the screen of the liquid crystal display has a lower contrast ratio (CR) than a front of the screen. Accordingly, development of an optical film capable of increasing the side contrast ratio is underway.

Such an optical film is configured such that light from a polarizing film can be diffused by a pattern formed at an interface between a low refractive index resin layer and a high refractive index resin layer as the light enters the high refractive index resin layer from the low refractive index resin layer, thereby improving the side contrast ratio. However, such a configuration of the optical film alone cannot sufficiently improve the contrast ratio.

In order to improve the side contrast ratio, there has been proposed a method of changing the shape of the pattern or a method of incorporating particles into the low refractive index resin layer or the high refractive index resin layer. However, the former has a problem in that even a minute change in pattern shape can cause drastic change in side contrast ratio. In addition, the latter has a problem in that an additional process is required to control a difference in index of refraction between the particles and the resin layer, and the presence of the particles can cause deterioration in optical transparence, such as increase in haze, or reduction in luminous efficacy.

The background technique of the present invention is disclosed in Japanese Unexamined Patent Publication No. 2006-251659.

SUMMARY

According to an aspect of embodiments of the present invention, a polarizing plate capable of improving the side contrast ratio of an optical display is provided.

According to another aspect of embodiments of the present invention, a polarizing plate capable of improving the front contrast ratio of an optical display is provided.

According to a further aspect of embodiments of the present invention, a polarizing plate which can significantly improve the side contrast ratio of an optical display without incorporating particles into a pattern layer and thus can prevent or substantially prevent reduction in optical transparency, such as increase in haze, due to the presence of particles while preventing or substantially preventing hindrance of emission of polarized light due to the presence of particles, thereby improving luminous efficacy, is provided.

According to another aspect of embodiments of the present invention, an optical display including the polarizing plate according to the present invention is provided.

In accordance with one or more embodiments of the present invention, a polarizing plate includes: a polarizing film; a first base layer; and a pattern layer, the first base layer and the pattern layer being sequentially arranged on a light exit surface of the polarizing film, wherein the pattern layer comprises a first layer and a second layer sequentially arranged on the first base layer, the first layer having a higher index of refraction than the second layer, and wherein the first layer includes a patterned portion at at least a portion thereof facing the second layer, the patterned portion including at least two optical patterns and a flat section between optical patterns of the at least two optical patterns that are adjacent to each other.

In accordance with one or more embodiments of the present invention, an optical display includes a polarizing plate according to the present invention.

According to an aspect of embodiments of the present invention, a polarizing plate capable of improving the side contrast ratio of an optical display is provided.

According to another aspect of embodiments of the present invention, a polarizing plate capable of improving the front contrast ratio of an optical display is provided.

According to an aspect of embodiments of the present invention, a polarizing plate which can significantly improve the side contrast ratio of an optical display without incorporating particles into a pattern layer and thus can prevent or substantially prevent reduction in optical transparency, such as increase in haze, due to the presence of particles while preventing or substantially preventing hindrance of emission of polarized light due to the presence of particles, thereby improving luminous efficacy, is provided.

DETAILED DESCRIPTION

Figure 1:
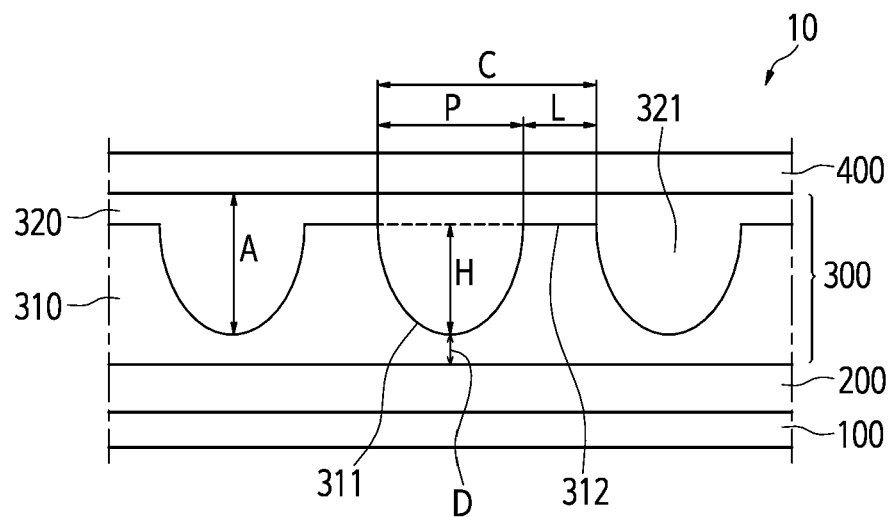
FIG. 1 is a cross-sectional view of a polarizing plate according to an embodiment of the present invention.

Some example embodiments of the present invention will be described in further detail with reference to the accompanying drawings to provide a thorough understanding of the invention to those skilled in the art. It is to be understood that the present invention may be embodied in different ways and is not limited to the following described example embodiments. In the drawings, portions irrelevant to the description may be omitted for clarity. Like components will be denoted by like reference numerals throughout the specification.

Herein, spatially relative terms, such as "upper" and "lower," are defined with reference to the accompanying drawings. Thus, it is to be understood that the term "upper surface" can be used interchangeably with the term "lower surface," and when an element, such as a layer or a film, is referred to as being placed "on" another element, it can be directly placed on the other element, or one or more intervening elements may be present. On the other hand, when an element is referred to as being placed "directly on" another element, there are no intervening elements therebetween.

Herein, the terms "horizontal direction" and "vertical direction" mean a longitudinal direction and a transverse direction of a rectangular screen of a liquid crystal display, respectively. Herein, "side" refers to (0°, 60°) in the spherical coordinate system represented by (φ, θ) in which a front side is indicated by (0°, 0°), a left end point is indicated by (180°, 90°), and a right end point is indicated by (0°, 90°) with reference to the horizontal direction.

Herein, "aspect ratio" refers to a ratio of maximum height of an optical pattern to maximum width thereof (maximum height/maximum width).

Herein, "pitch" means the distance between a pair of adjacent optical patterns, for example, the sum of a maximum width W of one optical pattern and a width L of one flat section adjacent thereto.

Herein, "bottommost portion" refers to the lowest portion in an engraved optical pattern, and may be one point or one plane.

Herein, "in-plane retardation (Re)" is a value measured at a wavelength of 550 nm and is represented by the following Equation A:

$$Re = (nx - ny) \times d,$$

where nx and ny are the indices of refraction in the slow and fast axes of a corresponding protective layer or base layer at a wavelength of 550 nm, respectively, and d is the thickness (unit: nm) of the protective layer or base layer.

Herein, the term "(meth)acryl" refers to acryl and/or methacryl.

Herein, "X to Y" indicates "X or more to Y or less."

According to one or more embodiments of the present invention, a polarizing plate in which a first base layer and a pattern layer described below in further detail are sequentially stacked on a light exit surface of a polarizing film can significantly improve the side contrast ratio of an optical display while minimizing or reducing a reduction in the front contrast ratio, as compared with a typical polarizing plate not including the pattern layer. Further, according to one or more embodiments of the present invention, a polarizing plate in which a first base layer and a pattern layer described below in further detail are sequentially stacked on a light exit surface of a polarizing film can significantly improve the side contrast ratio of an optical display simply through control over the relation between layers in the pattern layer in terms of index of refraction.

Figure 2:
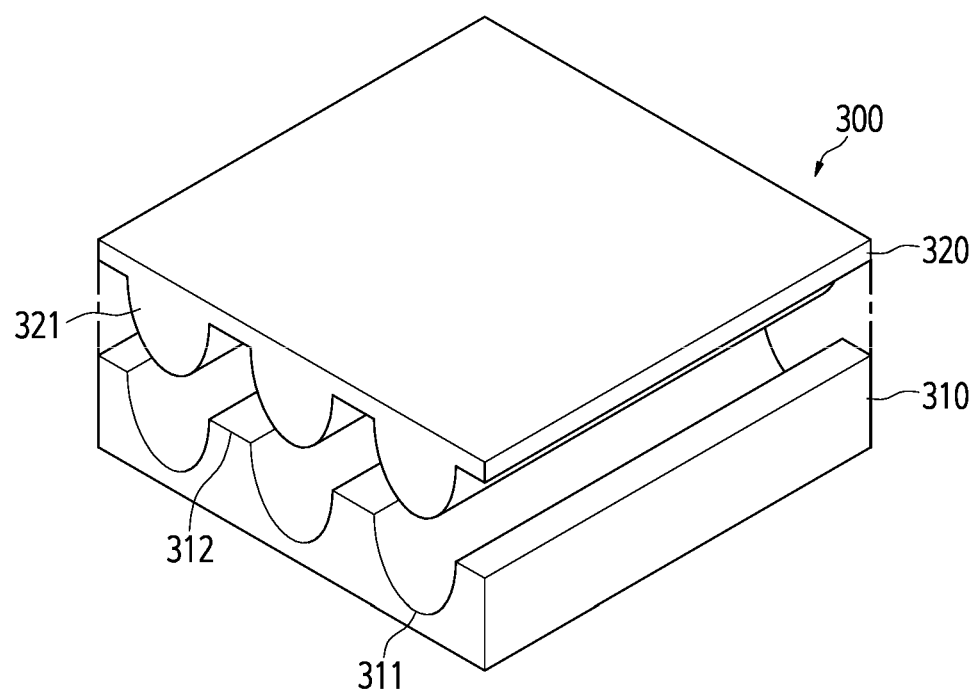
FIG. 2 is an exploded perspective view of a pattern layer of a polarizing plate according to an embodiment.

Herein, a polarizing plate according to an embodiment of the present invention will be described with reference to FIG. 1 and FIG. 2. FIG. 1 is a cross-sectional view of a polarizing plate according to an embodiment of the present invention; and FIG. 2 is an exploded perspective view of a pattern layer shown in FIG. 1.

Referring to FIG. 1, according to an embodiment, a polarizing plate 10 may include a polarizing film 100, a first base layer 200, a pattern layer 300, and a second base layer 400.

The first base layer 200, the pattern layer 300, and the second base layer 400 are sequentially formed on a light exit surface of the polarizing film 100. The polarizing film 100 can polarize light received from a liquid crystal panel (not shown in FIG. 1) and transmit the light therethrough. Polarized light from the polarizing film 100 may pass through the first base layer 200, the pattern layer 300, and the second base layer 400 in the stated order.

In one embodiment, the polarizing film 100 may include a polarizer. The polarizer may include a polyvinyl alcohol-based polarizer prepared by uniaxially stretching a polyvinyl alcohol film, or a polyene-based polarizer prepared by dehydrating a polyvinyl alcohol film. In an embodiment, the polarizer may have a thickness of 5 μm to 40 μm, for example, 5 μm, 10 μm, 15 μm, 20 μm, 25 μm, 30 μm, 35 μm, or 40 μm. Within this range, the polarizer can be used in an optical display.

In another embodiment, the polarizing film 100 may further include a base layer formed on at least one surface of the polarizer. The base layer can improve reliability of the polarizing plate by protecting the polarizer while enhancing mechanical strength of the polarizing plate. The base layer may include at least one of an optically clear protective film or an optically clear protective coating layer. The base layer may be as described below.

Although not shown in FIG. 1, at least one of the aforementioned base layer and an adhesive layer may be further stacked on a light entry surface of the polarizing film 100. The adhesive layer can adhesively attach the polarizing plate to an adherend, for example, a liquid crystal panel, an OLED panel, or the like.

The first base layer 200 is formed on a light entry surface of the pattern layer 300 and can support the pattern layer 300. In an embodiment, the first base layer 200 may be directly formed on a first layer 310 of the pattern layer 300, thereby reducing the thickness of the polarizing plate 10. Herein, the expression "directly formed on" means that no adhesive layer, bonding layer, or adhesive bonding layer is interposed between the first base layer 200 and the pattern layer 300. However, it is to be understood that the present invention is not limited thereto and, in another embodiment, the first base layer may be formed on the first layer via an adhesive layer, a bonding layer, or an adhesive bonding layer.

In an embodiment, the first base layer 200 may have a total transmittance of 90% or more, for example, 90% to 100%, 90%, 91%, 92%, 93%, 94%, 95%, 96%, 98%, 99%, or 100%, as measured in the visible region. Within this range, the first base layer can transmit incident light without affecting the incident light.

The first base layer 200 may be a protective film or a protective coating layer which includes a light entry surface and a light exit surface opposite the light entry surface. In an embodiment, the protective film is used as the first base layer to more firmly support the pattern layer.

When the first base layer is the protective film, the first base layer may include a single layer of an optically clear resin film. However, it is to be understood that the present invention is not limited thereto and, in an embodiment, the first base layer may include multiple layers of an optically clear resin film. In an embodiment, the protective film may be prepared by melt extrusion of a resin. A process of stretching the resin may be further added. The resin may include at least one of a cellulose ester resin such as triacetylcellulose (TAC), a cyclic polyolefin resin, such as amorphous cyclic polyolefin (COP), a polycarbonate resin, a polyester resin, such as polyethylene terephthalate (PET), a polyether sulfone resin, a polysulfone resin, a polyamide resin, a polyimide resin, a non-cyclic polyolefin resin, a poly(meth)acrylate resin, such as a poly(methyl methacrylate) resin, a polyvinyl alcohol resin, a polyvinyl chloride resin, and a polyvinylidene chloride resin.

Although the protective film may be a non-stretched film, the protective film may be a retardation film or isotropic optical film that is obtained by stretching the resin by a method (e.g., a predetermined method) and has a certain range of retardation. In one embodiment, the protective film may be an isotropic optical film having an Re of 60 nm or less, and, in an embodiment, 0 nm to 60 nm, and, in an embodiment, 40 nm to 60 nm, for example, 40 nm, 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, or 60 nm. Within this range, the polarizing plate can provide good image quality through compensation for viewing angle. Herein, "isotropic optical film" refers to a film having substantially the same nx, ny, and nz, and the expression "substantially the same" includes not only a case in which nx, ny, and nz are the same, but also a case in which there is an acceptable margin of error between nx, ny, and nz. In addition, the protective film may be uniaxially stretched to prevent or substantially prevent generation of rainbow spots on the protective film.

In one embodiment, the first base layer may have an Re of 15,000 nm or less, and, in an embodiment, 3,000 nm to 15,000 nm, and, in an embodiment, 4,000 nm or more, and, in an embodiment, 5,000 nm or more, and, in an embodiment, 6,000 nm to 15,000 nm or 8,000 nm to 15,000 nm, for example, 8,000 nm, 9,000 nm, 10,000 nm, 11,000 nm, 12,000 nm, 13,000 nm, 14,000 nm, or 15,000 nm. Within this range, the pattern layer can further diffuse light passing through the first base layer, thereby improving the contrast ratio of an optical display.

The protective coating layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group per molecule, or an oxetane compound having at least one oxetane ring per molecule. The epoxy compound may include at least one of a hydrogenated epoxy compound, a chained aliphatic epoxy compound, a cyclic aliphatic epoxy compound, and an aromatic epoxy compound.

Examples of the radical polymerizable curable compound may include a (meth)acrylate monomer having at least one (meth)acryloyloxy group per molecule and a (meth)acrylate oligomer having at least two (meth)acryloyloxy groups per molecule, which may be obtained by reacting at least two compounds containing a functional group. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer. The polymerization initiator can cure the actinic radiation-curable compound. The polymerization initiator may include at least one of a photocationic initiator and a photosensitizer. Each of the photocationic initiator and the photosensitizer may be any commonly known in the art.

In an embodiment, the first base layer 200 may have a thickness of 5 µm to 200 µm, and, in an embodiment, 30 µm to 120 µm. In an embodiment, the first base layer 200 of the protective film type may have a thickness of 30 µm to 100 µm, and, in an embodiment, 30 µm to 90 µm, for example, 30 µm, 40 µm, 50 µm, 60 µm, 70 µm, 80 µm, or 90 µm, and the first base layer 200 of the protective coating layer type may have a thickness of 1 µm to 50 µm, for example, 1 µm, 5 µm, 10 µm, 20 µm, 30 µm, 40 µm, or 50 µm. Within this range, the first base layer 200 can be used in the polarizing plate.

The first base layer 200 may be formed on at least one surface thereof with a surface-treatment layer, such as any of a primer layer, a hard coat layer, a fingerprint-resistant layer, an antireflective layer, an antiglare layer, a low reflectivity layer, and an ultra-low reflectivity layer. The hard coat layer, the fingerprint-resistant layer, the antireflective layer, and the like can provide additional functions to the first base layer, the polarizing film, and the like. Particularly, the primer layer can improve bonding of the first base layer to an adherend (for example, the pattern layer or the polarizing film).

The pattern layer 300 may be formed on the light exit surface of the first base layer 200 and can diffuse light passing through the first base layer 200.

The pattern layer 300 may include a first layer 310 and a second layer 320 opposite the first layer 310. In an embodiment, the pattern layer 300 includes only the first layer 310 and the second layer 320.

The first layer 310 has a higher index of refraction than the second layer 320. The first layer 310 may include a patterned portion which is formed at at least a portion of the first layer 310 facing the second layer 320 and includes at least two engraved optical patterns 311 and a flat section 312 between adjacent engraved optical patterns 311. In this way, the polarizing plate can remarkably improve the side contrast ratio with respect to light from the first base layer 200. The inventors of the present invention found that, when the second layer 320 of the pattern layer 300 has a higher index of refraction than the first layer 310 or the polarizing film 100 is formed at the side of the second layer 320, the effect of improving the side contrast ratio can be considerably reduced.

In an embodiment, the first layer 310 is directly formed on the second layer 320, and the patterned portion described below in further detail is formed at an interface between the first layer 310 and the second layer 320. In FIG. 1, the patterned portion is shown as formed on the entire contact surface between the first layer 310 and the second layer 320. However, it is to be understood that the present invention is not limited thereto and, in another embodiment, the patterned portion may be partially formed on the contact surface between the first layer 310 and the second layer 320.

The patterned portion includes: at least two engraved optical patterns 311; and a flat section 312 between adjacent engraved optical patterns 311. The polarizing plate includes a repeated combination of the engraved optical pattern 311 and the flat section 312. Herein, "engraved optical pattern" refers to an optical pattern protruding toward the light exit surface of the first base layer 200.

The patterned portion may satisfy the following Relation 1. When the patterned portion satisfies Relation 1, the polarizing plate can further improve the side contrast ratio of an optical display.

$$1 < C/P \leq 10, \qquad \text{Relation 1}$$

where C denotes a pitch (unit: µm) of the patterned portion and P denotes a maximum width (unit: µm) of the optical pattern.

In an embodiment, C/P (ratio of C to P) has a value of 1.1 to 8.0, and, in an embodiment, 1.1 to 5.0, for example, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5.

The engraved optical pattern 311 has a curved surface. Polarized light from the first layer 310 enters the second layer 320 through the curved surface. With the curved surface, the engraved optical pattern allows light having passed through the first base layer 200 and the first layer 311 to enter the second layer 320 in various directions depending on the point where the light is incident on the engraved optical pattern 311.

FIG. 1 shows a polarizing plate in which the curved surface is an aspherical surface and the engraved optical pattern 311 is a lenticular lens pattern. However, it is to be understood that the present invention is not limited thereto, and the curved surface may be a spherical, paraboloidal, ellipsoidal, hyperboloidal, or amorphous curved surface. Although the engraved optical pattern is shown as having a smooth curved surface, in an embodiment, the engraved optical pattern may have unevenness to further improve light diffusion.

In an embodiment, rather than the lenticular lens pattern, the engraved optical pattern 311 may be a pattern that includes a flat surface formed at a bottommost portion thereof and flat inclined surfaces and has a trapezoidal cross-section (for example, a top-truncated prism shape having a triangular cross-section or a cut-prism shape), an engraved pattern that includes a flat surface formed at a bottommost portion thereof and curved inclined surfaces (for example, a cut-lenticular lens pattern obtained by truncating the bottom of the lenticular lens pattern of FIG. 1 or a bottom-truncated microlens (cut-microlens) pattern), or a pattern that has an N-sided polygonal cross-section (N being an integer of 3 to 20), such as a rectangular or square cross-section.

In an embodiment, the engraved optical pattern 311 may have an aspect ratio of more than 0 and less than or equal to 3.0, and, in an embodiment, 0.4 to 3.0, and, in an embodiment, 0.7 to 3.0, for example, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. Within this range, the polarizing plate can improve the side contrast ratio and side viewing angle of an optical display.

In an embodiment, the engraved optical pattern 311 may have a maximum width P of more than 0 $\mu m$ and less than or equal to 15 $\mu m$, and, in an embodiment, 2 $\mu m$ to 15 $\mu m$, for example, 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 11 $\mu m$, 12 $\mu m$, 13 $\mu m$, 14 $\mu m$, or 15 $\mu m$. In an embodiment, the engraved optical pattern 311 may have a maximum height H of more than 0 $\mu m$ and less than or equal to 50 $\mu m$, and, in an embodiment, 1 $\mu m$ to 45 $\mu m$, for example, 1 $\mu m$, 5 $\mu m$, 10 $\mu m$, 15 $\mu m$, 20 $\mu m$, 25 $\mu m$, 30 $\mu m$, 35 $\mu m$, 40 $\mu m$, or 45 $\mu m$. Within these ranges of maximum width and maximum height, the engraved optical pattern can provide light diffusion.

In an embodiment, a ratio of the sum of maximum widths of the engraved optical patterns 311 to the overall width of the first layer 310 may have a value of 40% to 60%, and, in an embodiment, 45% to 55%, for example, 45%, 46%, 47%, 48%, 49%, 50%, 51%, 52%, 53%, 54%, or 55%. Within this range, the polarizing plate can improve the side contrast ratio and side viewing angle of an optical display. The engraved optical patterns 311 may be arranged at a pitch (e.g., a predetermined pitch) C to further diffuse condensed light. In an embodiment, the engraved optical patterns 311 may be arranged at a pitch C of more than 0 $\mu m$ and 60 $\mu m$ or less, and, in an embodiment, 5 $\mu m$ to 60 $\mu m$, for example, 5 $\mu m$, 10 $\mu m$, 15 $\mu m$, 20 $\mu m$, 25 $\mu m$, 30 $\mu m$, 35 $\mu m$, 40 $\mu m$, 45 $\mu m$, 50 $\mu m$, 55 $\mu m$, or 60 $\mu m$. Within this range, the polarizing plate can provide further improved light condensation and diffusion.

In an embodiment, a ratio of the maximum width P of the engraved optical pattern 311 to a width L of the flat section 312 may have a value of more than 0 and less than or equal to 9, and, in an embodiment, 0.1 to 3, and, in an embodiment, 0.15 to 2, for example, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2. Within this range, the polarizing plate can reduce a difference between the front contrast ratio and side contrast ratio of an optical display while improving the contrast ratio of the optical display at a given side viewing angle and at a given front viewing angle. In addition, the polarizing plate can prevent or substantially prevent the Moiré phenomenon.

In an embodiment, a minimum distance between the engraved optical pattern 311 and the first base layer 200, that is, a minimum distance D between the bottommost portion of the engraved optical pattern 311 and the first base layer 200 (also referred to as "wall thickness") may have a value of more than 0 $\mu m$ and less than or equal to 30 $\mu m$, and, in an embodiment, 1 $\mu m$ to 20 $\mu m$, for example, 1 $\mu m$, 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 11 $\mu m$, 12 $\mu m$, 13 $\mu m$, 14 $\mu m$, 15 $\mu m$, 16 $\mu m$, 17 $\mu m$, 18 $\mu m$, 19 $\mu m$, or 20 $\mu m$. Within this range, film hardness and uniformity of coating thickness can be secured.

In an embodiment, a ratio (H/A) of the maximum height H of the engraved optical pattern 311 to a distance A between the uppermost surface of the pattern layer 300 and the bottommost portion of the engraved optical pattern 311 may have a value of more than 0 and less than or equal to 1, and, in an embodiment, 0.3 to 1.0, for example, 0.3, 0.4, 0.5, 0.6, 0.7, 0.8, 0.9, or 1.0. Within this range, film hardness and uniformity of coating thickness can be secured.

In an embodiment, in a cross-sectional area of the pattern layer 300, a ratio of the sum of cross-sectional areas of filling patterns 321 of the second layer 320 to the overall cross-sectional area of the first layer 310 may have a value of 40% to 60%, and, in an embodiment, 45% to 55%, for example, 45%, 46%, 47%, 48%, 49%, 50%, 51%, 52%, 53%, 54%, or 55%. Within this range, the polarizing plate can improve side visibility of an optical display.

The second layer 320 includes a filling pattern 321 formed at the interface with the first layer 310 and filling at least a portion of the engraved optical pattern 311. The filling pattern 321 may completely fill the optical pattern, or partially fill the optical pattern. In an embodiment, the filling pattern 321 completely fills the optical pattern 311.

Although, in FIG. 1, the polarizing plate is shown as including engraved optical patterns having the same aspect ratio, maximum width, maximum height, and pitch, it is to be understood that the present invention is not limited thereto and, in other embodiments, the polarizing plate may include engraved optical patterns having different aspect ratios, maximum widths, maximum heights, and pitches.

The flat section 312 may be formed between adjacent engraved optical patterns 311. The flat section 312 allows polarized light from the first layer 310 to directly enter the second layer 320 therethrough, thereby improving both the front contrast ratio and front brightness of an optical display.

Polarized light from the first base layer 200 is transmitted from the first layer 310 to the second layer 320, and the protrusion of the engraved optical pattern 311 faces the first base layer 200. In an embodiment, the flat section 312 may have a width L of more than 0 μm and less than or equal to 50 μm, and, in an embodiment, more than 0 μm and less than or equal to 30 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm. Within this range, the polarizing plate can provide light condensation and diffusion.

Although, in FIG. 1, the polarizing plate is shown as including flat sections having the same width, it is to be understood that the present invention is not limited thereto, and, in another embodiment, the polarizing plate may include flat sections having different widths.

Referring to FIG. 2, in an embodiment, the engraved optical patterns 311 may extend in a stripe shape in a longitudinal direction thereof. In this way, the polarizing plate can increase the side viewing angle of an optical display. In another embodiment, the engraved optical patterns may be formed in a dot shape. Herein, the term "dot" means that the optical patterns are dispersed.

The first layer 310 has a higher index of refraction than the second layer 320. The inventors of the present invention found that the side contrast ratio of an optical display can be remarkably improved by allowing polarized light from the polarizing film 100 to be transmitted to the second layer 320 through the first layer 310 and allowing the first layer 310 to include the engraved optical pattern 311 protruding toward the polarizing film 100. In an embodiment, a difference in index of refraction between the first layer 310 and the second layer 320 may have a value of 0.05 or more, and, in an embodiment, 0.05 to 0.3, and, in an embodiment, 0.05 to 0.2, for example, 0.1 to 0.2. Within this range, the polarizing plate can further improve the side contrast ratio of an optical display.

In an embodiment, the first layer 310 may have an index of refraction of 1.50 or more, and, in an embodiment, 1.50 to 1.70, and, in an embodiment, 1.50 to 1.65. Within this range, the polarizing plate can improve the side contrast ratio of an optical display. In an embodiment, the second layer 320 may have an index of refraction of more than 0 and less than 1.50, and, in an embodiment, more than or equal to 1.3 and less than 1.50, and, in an embodiment, more than or equal to 1.35 and less than 1.50. Within this range, the polarizing plate can improve the side contrast ratio of an optical display.

The first layer 310 may be formed of a composition including a resin capable of satisfying the aforementioned index of refraction range. For example, the first layer 310 may include a UV curable or thermally curable resin, for example, at least one of a (meth)acrylic resin, an epoxy resin, a urethane resin, and a silicone resin, without being limited thereto. Here, the composition may further include any of various additives, such as an initiator promoting curing of the resin.

In one embodiment, the first layer 310 may be a particle-free resin layer. Conventionally, in order to improve the side contrast ratio of an optical display, there has been proposed a method of incorporating high-refractive index particles (having a higher index of refraction than the first layer), for example, a light diffusing agent, a light absorbent, or the like, into a high-refractive index layer. According to the present invention, through adjustment of the stacking relation between the first layer 310 and the second layer 320 with respect to the light exit surface of the polarizing film and the protruding direction of the engraved optical pattern, the side contrast ratio can be remarkably improved without incorporating such particles into the first layer 310 and, thus, the optical transparency and luminous efficacy of an optical display can be further improved. In an embodiment, the polarizing plate may have a haze of 0% to 30%, and, in an embodiment, 0% to 25%, for example, 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25%.

The second layer 320 may be formed of a composition including a resin capable of satisfying the aforementioned index of refraction range. For example, the second layer 320 may include a UV curable or thermally curable resin, for example, at least one of a (meth)acrylic resin, an epoxy resin, a urethane resin, and a silicone resin, without being limited thereto. Here, the composition may further include any of various additives, such as an initiator promoting curing of the resin.

In one embodiment, the second layer 320 may be a particle-free resin layer. Conventionally, in order to improve the side contrast ratio of an optical display, there has been proposed a method of incorporating particles, for example, a light diffusing agent, a light absorbent, or the like, into the second layer. According to the present invention, through adjustment of the stacking relation between the first layer 310 and the second layer 320 with respect to the light exit surface of the polarizing film and the protruding direction of the engraved optical pattern, side contrast ratio can be remarkably improved without incorporating such particles into the second layer 320.

In one embodiment, the second layer 320 may be formed of a bonding agent composition that exhibits bonding properties after curing to have bonding properties. Thus, the second layer 320 can be directly bonded to the second base layer 400, thereby reducing the thickness of the polarizing plate. The second layer 320 may have good bonding properties with respect to the second base layer 400, especially a polyester film.

In an embodiment, the pattern layer 300 may have a thickness of more than 0 μm and less than or equal to 200 μm, and, in an embodiment, 10 μm to 150 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, or 150 μm. Within this range, the pattern layer can be used in the polarizing plate.

The second base layer 400 may be formed on the light exit surface of the pattern layer 300 to transmit light from the pattern layer 300 therethrough. In an embodiment, the second base layer 400 may be directly formed on the second layer 320 of the pattern layer 300, thereby reducing the thickness of the polarizing plate 10. Herein, the expression "directly formed on" means that no adhesive layer, bonding layer, or adhesive bonding layer is interposed between the second base layer 400 and the pattern layer 300. However, it is to be understood that the present invention is not limited thereto and, in other embodiments, the second base layer 400 may be formed on the second layer 320 via an adhesive layer, a bonding layer, or an adhesive bonding layer.

The material, thickness, index of refraction, and retardation of the second base layer 400 may be the same as or different from those of the first base layer 200.

In one embodiment, the second base layer may have an Re of 15,000 nm or less, and, in an embodiment, 3,000 nm to 15,000 nm, and, in an embodiment, 4,000 nm or more, and, in an embodiment, 5,000 nm or more, and, in an embodiment, 6,000 nm to 15,000 nm or 8,000 nm to 15,000 nm, for example, 8,000 nm, 9,000 nm, 10,000 nm, 11,000 nm, 12,000 nm, 13,000 nm, 14,000 nm, or 15,000 nm. Within this range, the polarizing plate can further diffuse light diffused through a contrast-improving layer, thereby further improving the contrast ratio of an optical display. In one embodiment, when the Re values of the first base layer 200 and the second base layer 400 fall within the aforementioned ranges, the polarizing plate can further improve the contrast ratio of an optical display.

Although not shown in FIG. 1, in an embodiment, a functional layer may be further formed on a light exit surface of the second base layer 400. The functional layer can provide additional functions to the polarizing plate. For example, the functional layer may include at least one of a primer layer, a hard coat layer, a fingerprint-resistant layer, an antireflective layer, an antiglare layer, a low reflectivity layer, and an ultra-low reflectivity layer, without being limited thereto.

Although the polarizing plate is shown as including the second base layer 400 formed on the pattern layer 300 in FIG. 1, it is to be understood that the present invention is not limited thereto and, in another embodiment, the second base layer 400 may be omitted. In this case, an uppermost surface of the second layer 320 may serve as a functional layer. Herein, the expression "serve as a functional layer" means that the uppermost surface of the second layer 320 functions as at least one of a primer layer, a hard coat layer, a fingerprint-resistant layer, an antireflective layer, an antiglare layer, a low reflectivity layer, and an ultra-low reflectivity layer. Here, the second layer 320 may serve as a functional layer by being subjected to surface treatment or the like during formation thereof.

Next, a polarizing plate according to another embodiment of the present invention will be described with reference to FIG. 3.

Figure 3:
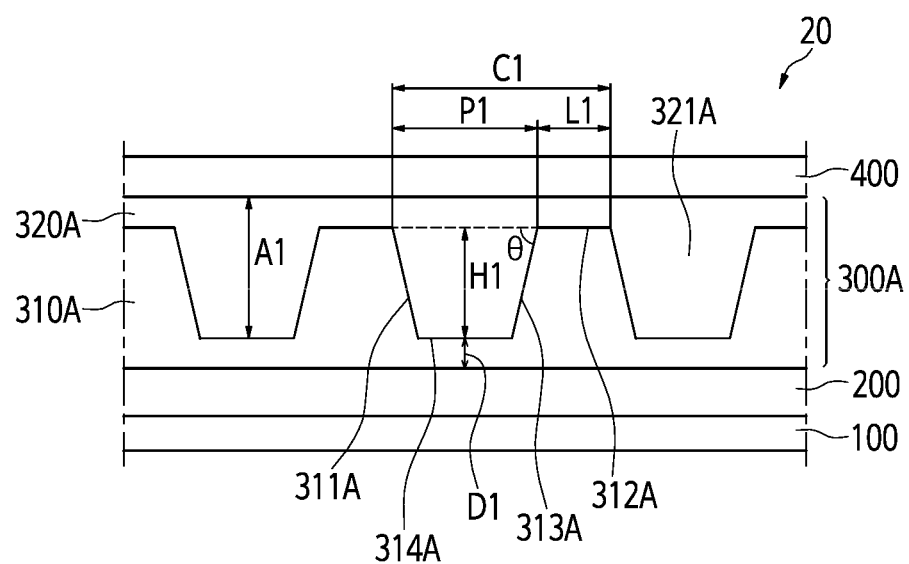
FIG. 3 is a cross-sectional view of a polarizing plate according to another embodiment of the present invention.

Referring to FIG. 3, a polarizing plate 20 according to another embodiment may include a pattern layer 300A. The polarizing plate 20 according to an embodiment is substantially the same as the polarizing plate 10 according to the above-described embodiment except that the pattern layer 300A is formed instead of the pattern layer 300.

In an embodiment, the pattern layer 300A includes a first layer 310A; and a second layer 320A directly formed on the first layer 310A, wherein a patterned portion described below in further detail below is formed at an interface between the first layer 310A and the second layer 320A.

The patterned portion includes at least two engraved optical patterns 311A; and a flat section 312A between adjacent engraved optical patterns 311A. The polarizing plate includes a repeated combination of the engraved optical pattern 311A and the flat section 312A at the interface between the first layer 310A and the second layer 320A. Herein, "engraved optical pattern" refers to an optical pattern protruding toward the first base layer 200.

In an embodiment, the patterned portion may satisfy Relation 1, and the engraved optical pattern 311A may have a base angle θ of 60° to 90°. Here, the base angle θ refers to an angle formed between an inclined surface 313A of the engraved optical pattern 311A and the maximum width P1 of the engraved optical pattern 311A. Here, the inclined surface 313A refers to an inclined surface of the engraved optical pattern 311A which is directly connected to the flat section 312A. When the patterned portion satisfies Relation 1 and the base angle of the engraved optical pattern falls within the aforementioned range, the polarizing plate can improve the side contrast ratio of an optical display while increasing the contrast ratio of the optical display at a given side viewing angle. In an embodiment, the base angle θ of the engraved optical pattern may have a value of 70° to 90°, and C1/P1 (a ratio of C1 to P1) may have a value of 1.1 to 8.0, for example, 1.1 to 5.0, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5.

$$1 < C1/P1 \leq 10, \quad \text{Relation 1}$$

where C1 denotes a pitch (unit: μm) of the patterned portion, and P1 denotes a maximum width (unit: μm) of the optical pattern.

Although the engraved optical pattern 311A is shown as having the same base angle at both sides thereof in FIG. 1, in an embodiment, the engraved optical pattern may have different base angles in which the base angles range from 60° to 90° as described above.

The engraved optical pattern 311A may be an engraved optical pattern that includes a first surface 314A formed at a bottommost portion thereof and at least one inclined surface 313A connected to the first surface 314A. Although, in FIG. 3, the engraved optical pattern is shown as a trapezoidal optical pattern in which two neighboring inclined surfaces 313A are connected by the first surface 314A, it is to be understood that the present invention is not limited thereto and, in other embodiments, the engraved optical pattern may be an optical pattern having a rectangular or square cross-section.

The first surface 314A is formed at the bottommost portion of the engraved optical pattern and can improve the viewing angle and brightness of an optical display by further diffusing light reaching the first layer 310A. Thus, the polarizing plate according to this embodiment can improve light diffusion, thereby minimizing or reducing brightness loss. The first surface 314A may be flat to allow easy manufacture of the polarizing plate. However, it should be understood that the present invention is not limited thereto and, in another embodiment, the first surface 314A may have fine unevenness or may be a curved surface.

In an embodiment, the first surface 314A may be parallel to at least one of the flat section 312A, a lowermost surface of the first layer 310A, and an uppermost surface of the second layer 320A.

In an embodiment, the first surface 314A may have a width of 0.5 μm to 30 μm, and, in an embodiment, 1 μm to 15 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, or 15 μm. Within this range, the polarizing plate can be used in an optical display and can improve the contrast ratio of the optical display.

In an embodiment, the engraved optical pattern 311A may have an aspect ratio of more than 0 and less than or equal to 3.0, and, in an embodiment, 0.4 to 3.0, and, in an embodiment, 0.7 to 3.0, for example, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. Within this range, the engraved optical pattern can improve the side contrast ratio and side viewing angle of an optical display.

In an embodiment, the engraved optical pattern 311A may have a maximum height H1 of more than 0 μm and less than or equal to 50 μm, and, in an embodiment, 1 μm to 45 μm, for example, 1 μm, 5 μm, 10 μm, 15 μm, 20 μm, 25 μm, 30 μm, 35 μm, 40 μm, or 45 μm. Within this range, the polarizing plate can improve the contrast ratio, viewing angle, and brightness of an optical display while preventing or substantially preventing the Moiré phenomenon.

In an embodiment, the engraved optical pattern 311A may have a maximum width P1 of more than 0 μm and less than or equal to 15 μm, and, in an embodiment, 2 μm to 15 μm, for example, 2 μm, 3 μm, 4 μm, 5 μm, 6 μm, 7 μm, 8 μm, 9

μm, 10 μm, 11 μm, 12 μm, 13 μm, 14 μm, or 15 μm. Within this range, the polarizing plate can improve the contrast ratio, viewing angle, and brightness of an optical display while preventing or substantially preventing the Moiré phenomenon.

In an embodiment, a minimum distance between the engraved optical pattern 311A and the first base layer 200, that is, a minimum distance D1 between the bottommost portion of the engraved optical pattern 311A and the first base layer 200 (also referred to as "wall thickness") may have a value of 0 μm to 30 μm, and, in an embodiment, 1 μm to 20 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm. Within this range, film hardness and uniformity of coating thickness can be secured.

In an embodiment, a ratio of the sum of maximum widths of the engraved optical patterns 311A to the overall width of the first layer 310A may have a value of 40% to 60%, and, in an embodiment, 45% to 55%, for example, 45%, 46%, 47%, 48%, 49%, 50%, 51%, 52%, 53%, 54%, or 55%. Within this range, the polarizing plate can improve the side contrast ratio and side viewing angle of an optical display.

In an embodiment, a ratio (H1/A1) of the maximum height H1 of the engraved optical pattern 311A to the distance A1 between the uppermost surface of the pattern layer 300A and the bottommost portion of the engraved optical pattern 311A may have a value of more than 0 and less than or equal to 1, and, in an embodiment, 0.3 to 1.0, for example, 0.3, 0.4, 0.5, 0.6, 0.7, 0.8, 0.9, or 1.0. Within this range, film hardness and uniformity of coating thickness can be secured. In FIG. 3, the patterned portion is shown as including engraved optical patterns having the same base angle, width of the first surface, maximum height, and maximum width. However, it is to be understood that, in other embodiments, the patterned portion may include engraved optical patterns having different base angles, widths of the first surface, maximum heights, and maximum widths.

The flat section 312A allows light passing through the first layer 310A to enter the second layer 320A therethrough, thereby improving front brightness of an optical display.

In an embodiment, a ratio of the maximum width P1 of the engraved optical pattern 311A to the width L1 of the flat section 312A may have a value of more than 0 and less than or equal to 9, and, in an embodiment, 0.1 to 3, and, in an embodiment, 0.15 to 2, for example, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2. Within this range, a difference between front and side contrast ratios of an optical display can be reduced while improving the contrast ratio in the optical display at a given side viewing angle and at a given front viewing angle. In addition, the Moiré phenomenon can be prevented or substantially prevented.

In an embodiment, the flat section 312A may have a width L1 of more than 0 μm and less than or equal to 50 μm, specifically more than 0 μm and less than or equal to 30 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm. Within this range, the polarizing plate can improve front brightness of an optical display.

The maximum width of one engraved optical pattern 311A and one flat section 312A adjacent thereto form one pitch (C1). In an embodiment, the engraved optical patterns may be arranged at a pitch C1 of more than 0 μm and less than or equal to 60 μm, and, in an embodiment, 5 μm to 60 μm, for example, 5 μm, 10 μm, 15 μm, 20 μm, 25 μm, 30 μm, 35 μm, 40 μm, 45 μm, 50 μm, 55 μm, or 60 μm. Within this range, the polarizing plate can improve the contrast ratio of an optical display while preventing or substantially preventing the Moiré phenomenon.

In an embodiment, in a cross-sectional area of the pattern layer 300A, a ratio of the sum of cross-sectional areas of filling patterns 321A of the second layer 312A to the overall cross-sectional area of the first layer 311A may have a value of 40% to 60%, and, in an embodiment, 45% to 55%, for example, 45%, 46%, 47%, 48%, 49%, 50%, 51%, 52%, 53%, 54%, or 55%. Within this range, the polarizing plate can improve side visibility of an optical display.

Although, in FIG. 3, the patterned portion is shown as including engraved optical patterns having the same pitch and maximum width, in other embodiments, the patterned portion may include engraved optical patterns having different pitches and maximum widths.

An optical display according to the present invention may include the polarizing plate according to the present invention. In one embodiment, the optical display may be a liquid crystal display or a light emitting device display.

In one embodiment, the polarizing plate 10 may be used as a viewer-side polarizing plate in a liquid crystal display. Herein, the term "viewer-side polarizing plate" means a polarizing plate disposed at a viewer side and opposite a light source with respect to a liquid crystal panel.

In one embodiment, the liquid crystal display includes a backlight unit, a first polarizing plate, a liquid crystal panel, and a second polarizing plate, which are stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto. In another embodiment, the polarizing plate according to the present invention may be used as a light source-side polarizing plate. Herein, the term "light source-side polarizing plate" refers to a polarizing plate disposed at the side of a light source with respect to the liquid crystal panel. In a further embodiment, the polarizing plate according to the present invention may be used as both the viewer-side polarizing plate and the light source-side polarizing plate with respect to the liquid crystal panel.

Next, the present invention will be described in more detail with reference to some examples. However, it should be noted that these examples are provided for illustration only and are not to be construed in any way as limiting the present invention.

Example 1

A resin (SSC-6000, SHIN-A T&C Co., Ltd.) was used as a high-refractive index layer composition (free from particles). Here, the high-refractive index layer composition may further include a predetermined solvent.

A resin (SSC-4000, SHIN-A T&C Co., Ltd.) was used as a low-refractive index layer composition (free from particles). Here, the low-refractive index layer composition may further include a predetermined solvent.

The high-refractive index layer composition was coated onto an upper surface of a transparent PET film for a first base layer (SRF, Toyobo Co., Ltd., thickness: 80 μm, Re=8,000 nm) to a predetermined thickness. Then, a film having patterns and flat sections alternately formed thereon was applied to the coating layer to transfer the patterns to the coating layer, followed by curing through UV irradiation, thereby forming a first layer including a patterned portion as shown in Table 1, in which engraved optical patterns and flat sections were alternately arranged. The low-refractive index layer composition was coated onto the first layer to completely fill the engraved optical patterns.

Then, the coating layer was laminated on one surface of a transparent PET film for a second base layer (SRF, Toyobo Co., Ltd., thickness: 80 μm, Re=8,000 nm), which had an antireflective layer formed on the other surface thereof, followed by curing through UV irradiation, thereby forming a second base layer on the pattern layer.

A polarizer was fabricated by stretching a polyvinyl alcohol film to 3 times an initial length thereof at 60° C. and adsorbing iodine to the stretched film, followed by stretching the film to 2.5 times the stretched length of the film in an aqueous solution of boric acid at 40° C.

A polarizing plate was fabricated by bonding the polarizer to a lower surface of the transparent PET film for the first base layer using a UV curable bonding agent.

The fabricated polarizing plate had a structure in which the first base layer, the first layer (high-refractive index layer), the second layer (low-refractive index layer), and the second base layer were sequentially stacked on a light exit surface of the polarizer and the engraved optical patterns protruded toward the first base layer.

Example 2

A resin (SSC-5500, SHIN-A T&C Co., Ltd.) was used as a high-refractive index layer composition (free from particles). Here, the high-refractive index layer composition may further include a predetermined solvent.

A resin (SSC-4500, SHIN-A T&C Co., Ltd.) was used as a low-refractive index layer composition (free from particles). Here, the low-refractive index layer composition may further include a predetermined solvent.

A polarizing plate was fabricated in the same manner as in Example 1 except that indices of refraction of the first and second layers were changed as shown in Table 2 using the high-refractive index layer composition and the low-refractive index layer composition.

Example 3

A polarizing plate was fabricated in the same manner as in Example 1 except that the engraved optical pattern and the flat section were changed as shown in Table 1.

Example 4

A polarizing plate was fabricated in the same manner as in Example 3 except that indices of refraction of the first and second layers were changed as shown in Table 2 using the high-refractive index layer composition and low-refractive index layer composition used in Example 2.

Comparative Example 1

A polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. A polarizing plate was fabricated by bonding a transparent PET film for a first base layer (SRF, Toyobo Co., Ltd., thickness: 80 μm, Re=14,000 nm) to an upper surface of the prepared polarizer using a UV curable bonding agent.

Comparative Example 2

One surface of a transparent PET film for a second base layer (SRF, Toyobo Co., Ltd., thickness: 80 μm, Re=8,000 nm), which had an antireflective layer formed on the other surface thereof, was coated with the high-refractive index layer composition of Example 1 to a predetermined thickness. Then, a film having patterns and flat sections alternately formed thereon was applied to the coating layer to transfer the patterns to the coating layer, followed by curing through UV irradiation, thereby forming a high-refractive index layer in which engraved optical patterns and flat sections as listed in Table 1 were alternately arranged. Then, the low-refractive index layer composition of Example 1 was coated onto the high-refractive index layer to completely fill the engraved optical patterns.

Then, the coating layer was laminated on an upper surface of a transparent PET film for a first base layer (SRF, Toyobo Co., Ltd., thickness: 80 μm, Re=8,000 nm), followed by curing. Then, a polarizing plate was fabricated by bonding the polarizer of Example 1 to a lower surface of the transparent PET film for the first base layer using a UV curable bonding agent, followed by curing.

Figure 4:
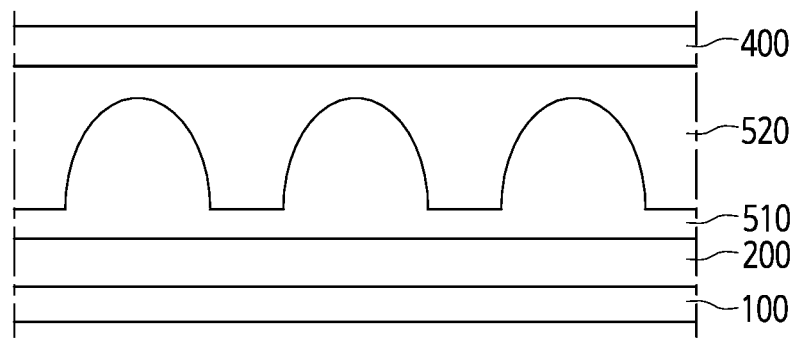
FIG. 4 is a cross-sectional view of a polarizing plate according to a comparative example.

FIG. 4 is a cross-sectional view of the polarizing plate of Comparative Example 2. Referring to FIG. 4, the polarizing plate of Comparative Example 2 includes: a polarizer 100, a first base layer 200, a low-refractive index layer 510, a high-refractive index layer 520, and a second base layer 400, wherein the first base layer, the low-refractive index layer, the high-refractive index layer, and the second base layer are sequentially stacked on a light exit surface of the polarizer 100.

Comparative Example 3

A polarizing plate was fabricated in the same manner as in Example 1 except that indices of refraction of the first and second layers were changed as listed in Table 2.

Comparative Example 4

A polarizing plate was fabricated in the same manner as in Comparative Example 2 except that indices of refraction of the first and second layers were changed as listed in Table 2 and zirconia, as high-refractive index particles, was added to the high-refractive index layer.

TABLE 1

| Patterned portion | Optical pattern | Maximum height of optical pattern (μm) | Maximum width of optical pattern (μm) | Width of flat section (μm) | Pitch (μm) | Wall thickness of optical pattern (μm) | Width of first surface of optical pattern (μm) | Base angle of optical pattern (°) |
|---|---|---|---|---|---|---|---|---|
| FIG. 1 | Engraved optical pattern having lenticular lens-shaped cross-section | 7 | 7 | 7 | 14 | 5 | — | — |
| FIG. 3 | Engraved optical pattern having trapezoidal cross-section | 7 | 9 | 5 | 14 | 5 | 6 | 86 |
| FIG. 4 | Embossed optical pattern having lenticular lens-shaped cross-section | 7 | 7 | 7 | 14 | 5 | — | — |

Each of the polarizing plates fabricated in the Examples and Comparative Examples was evaluated as to the following properties. Results are shown in Table 2.

Fabrication of Light Source-Side Polarizing Plate

A polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetylcellulose film (thickness: 80 μm) was bonded to both surfaces of the polarizer using a bonding agent for polarizing plates (Z-200, Nippon Goshei Co., Ltd.), thereby fabricating a polarizing plate. The fabricated polarizing plate was used as a light source-side polarizing plate.

Fabrication of Liquid Crystal Display Module

A liquid crystal display module was fabricated by sequentially assembling the fabricated light source-side polarizing plate, a liquid crystal panel (PVA mode), and each of the polarizing plates fabricated in the Examples and Comparative Examples. Here, assembly was conducted such that the second base layer of the polarizing plate was located outermost.

An LED light source, a light guide plate, and the liquid crystal display module were assembled into a liquid crystal display including a single edge-type LED light source (having the same configuration as a Samsung TV (55 inch UHD TV (2016 model), model number: UN55KS8000F) except for the liquid crystal display module fabricated using each of the polarizing plates fabricated in the Examples and Comparative Examples).

Brightness in white mode and in black mode was measured at the front (0°,) 0° and side (0°, 60°) in a spherical coordinate system using an EZCONTRAST X88RC (EZXL-176R-F422A4, ELDIM).

A front contrast ratio was calculated as a ratio of a brightness value in the white mode to a brightness value in the black mode, as measured in the spherical coordinates (0°, 0°). A side contrast ratio was calculated as a ratio of a brightness value in the white mode to a brightness value in the black mode, as measured in the spherical coordinates (0°, 60°).

In Table 2, the ½ viewing angle refers to a viewing angle having a brightness of ½ of the front brightness.

In Table 2, the ⅓ viewing angle refers to a viewing angle having a brightness of ⅓ of the front brightness.

Optical transparency: Optical transparency was measured on each of the polarizing plates fabricated in the Examples and Comparative Examples. When a tested polarizing plate had a haze of 0% to 30%, the polarizing plate was evaluated as "translucent," and, when a tested polarizing plate had a haze of more than 30%, the polarizing plate was evaluated as "opaque."

TABLE 2

| | Example | | | | Comparative Example | | | |
|---|---|---|---|---|---|---|---|---|
| | 1 | 2 | 3 | 4 | 1 | 2 | 3 | 4 |
| Patterned portion | FIG. 1 | FIG. 1 | FIG. 3 | FIG. 3 | — | FIG. 4 | FIG. 1 | FIG. 4 |
| Index of refraction of first layer | 1.6 | 1.55 | 1.6 | 1.55 | — | 1.4 | 1.4 | 1.4 |

TABLE 2-continued

| | | Example | | | | Comparative Example | | | |
|---|---|---|---|---|---|---|---|---|---|
| | | 1 | 2 | 3 | 4 | 1 | 2 | 3 | 4 |
| Index of refraction of second layer | | 1.4 | 1.45 | 1.4 | 1.45 | — | 1.6 | 1.6 | 1.6 |
| Inclusion of particles in second layer | | x | x | x | x | — | x | x | o |
| Front brightness (nit) | White mode | 470 | 475 | 472 | 477 | 500 | 455 | 460 | 450 |
| | Black mode | 0.148 | 0.146 | 0.147 | 0.145 | 0.120 | 0.158 | 0.157 | 0.159 |
| Contrast ratio | Front | 3166 (76%) | 3249 (78%) | 3208 (77%) | 3291 (79%) | 4166 (100%) | 2874 (69%) | 2916 (70%) | 2833 (68%) |
| | Side | 455 (236%) | 425 (220%) | 444 (230%) | 430 (223%) | 193 (100%) | 288 (149%) | 270 (140%) | 291 (151%) |
| ½ viewing angle (°) | | 85 | 83 | 83 | 81 | 71 | 79 | 77 | 80 |
| ⅓ viewing angle (°) | | 115 | 112 | 113 | 111 | 95 | 103 | 102 | 103 |
| Optical transparency | | Translucent | Translucent | Translucent | Translucent | Translucent | Translucent | Translucent | Opaque |

\* In Table 2, the numerical value in parentheses refers to a ratio in percent of the contrast ratio of each of the liquid crystal displays according to the Examples and Comparative Examples to the contrast ratio of the liquid crystal display according to Comparative Example 1.

As shown in Table 2, the polarizing plate according to the present invention could significantly improve the side contrast ratio while minimizing or reducing reduction in the front contrast ratio. In addition, the polarizing plate according to the present invention had good optical transparency. Conversely, the polarizing plates of Comparative Examples 2 to 3, which were free from particles and had a different structure than the polarizing plate according to the present invention, caused reduction in the front contrast ratio while providing considerably poor improvement in the side contrast ratio, as compared with the polarizing plate according to the present invention. In addition, the polarizing plate of Comparative Example 4 exhibited poor properties in terms of transparency and uniformity of brightness.

While some example embodiments have been described herein, it is to be understood that various modifications, changes, alterations, and equivalent embodiments can be made by those skilled in the art without departing from the spirit and scope of the present invention.

What is claimed is:

1. A polarizing plate comprising:
a polarizing film; a first base layer; and a pattern layer, the first base layer and the pattern layer being sequentially arranged on a side of the polarizing film corresponding to a light exit surface of the polarizing film,
wherein the pattern layer comprises a first layer and a second layer sequentially arranged on the first base layer, the first layer having a higher index of refraction than the second layer, the first base layer, the first layer, and the second layer being sequentially arranged in a direction away from the light exit surface of the polarizing film,
wherein the first layer comprises a patterned portion, at least a portion thereof facing the second layer,
wherein the patterned portion comprises at least two optical patterns and a flat section between optical patterns of the at least two optical patterns that are adjacent to each other,
wherein the pattern layer has a wall thickness of more than 0 μm and less than or equal to 30 μm,
wherein the polarizing plate further comprises a second base layer on a light exit surface of the second layer, and
wherein the first base layer is directly on the first layer and has an Re of 3,000 nm to 15,000 nm at a wavelength of 550 nm, and the second base layer is directly on the second layer and has an Re of 3,000 nm to 15,000 nm at a wavelength of 550 nm.

2. The polarizing plate according to claim 1, wherein a difference in index of refraction between the first layer and the second layer is 0.05 or more.

3. The polarizing plate according to claim 1, wherein the first layer comprises a particle-free resin layer.

4. The polarizing plate according to claim 1, wherein the second layer comprises a particle-free resin layer.

5. The polarizing plate according to claim 1, wherein each of the optical patterns comprises at least one of a lenticular lens pattern, a pattern comprising a flat surface at a bottommost portion thereof and flat inclined surfaces and having a polygonal cross-section, a pattern comprising a flat surface at a bottommost portion thereof and curved inclined surfaces, and a pattern having an N-sided polygonal cross-section.

6. The polarizing plate according to claim 1, wherein each of the optical patterns comprises a lenticular lens pattern or a pattern comprising a flat surface at a bottommost portion thereof and flat inclined surfaces and having a polygonal cross-section.

7. The polarizing plate according to claim 1, wherein the patterned portion satisfies the following Relation 1:

$$1 < C/P \leq 10,$$

where C denotes a pitch (unit: μm) of the patterned portion and P denotes a maximum width (unit: μm) of the optical pattern.

8. The polarizing plate according to claim 1, wherein each of the optical patterns comprises an engraved optical pattern comprising a flat surface at a bottommost portion thereof and flat inclined surfaces and having a polygonal cross-section or an engraved lenticular lens pattern.

9. The polarizing plate according to claim 1, wherein each of the optical patterns has an aspect ratio of more than 0 and less than or equal to 3.0.

10. The polarizing plate according to claim 1, wherein a ratio H/A of a maximum height H of the optical pattern to a distance A between an uppermost surface of the pattern layer and a bottommost portion of the optical pattern has a value of more than 0 and less than or equal to 1.

11. The polarizing plate according to claim 1, wherein each of the optical patterns comprises an engraved optical pattern, and the second layer comprises a filling pattern at an interface with the first layer and filling at least a portion of the engraved optical pattern.

12. The polarizing plate according to claim 11, wherein, in a cross-sectional area of the pattern layer, a ratio of the sum of cross-sectional areas of the filling patterns of the second layer to an overall cross-sectional area of the first layer is from 40% to 60%.

13. The polarizing plate according to claim 1, wherein the second base layer comprises at least one of a cellulose ester resin, a cyclic polyolefin resin, a polycarbonate resin, a polyester resin, a polyether sulfone resin, a polysulfone resin, a polyamide resin, a polyimide resin, a non-cyclic polyolefin resin, a poly(meth)acrylate resin, a polyvinyl alcohol resin, a polyvinyl chloride resin, and a polyvinylidene chloride resin.

14. The polarizing plate according to claim 1, further comprising:
    a functional layer on a light exit surface of the second base layer,
    wherein the functional layer comprises at least one of a primer layer, a hard coat layer, a fingerprint-resistant layer, an antireflective layer, an antiglare layer, a low reflectivity layer, and an ultra-low reflectivity layer.

15. The polarizing plate according to claim 1, wherein the light exit surface of the second layer is configured to serve as a functional layer.

16. An optical display comprising the polarizing plate according to claim 1.

* * * * *